(12) United States Patent
Ni et al.

(10) Patent No.: US 11,050,814 B2
(45) Date of Patent: Jun. 29, 2021

(54) METHOD, DEVICE AND VEHICLE FOR MESSAGE DEDUPLICATION

(71) Applicant: BAIDU ONLINE NETWORK TECHNOLOGY (BEIJING) CO., LTD., Beijing (CN)

(72) Inventors: Zhongjun Ni, Beijing (CN); Weifeng Yao, Beijing (CN); Liming Xia, Beijing (CN); Jiankang Xin, Beijing (CN); Chengliang Deng, Beijing (CN); Zhuo Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/553,927

(22) Filed: Aug. 28, 2019

(65) Prior Publication Data
US 2020/0076881 A1    Mar. 5, 2020

(30) Foreign Application Priority Data
Aug. 30, 2018 (CN) .......................... 201811005570.4

(51) Int. Cl.
*H04L 29/08* (2006.01)
*H04L 29/06* (2006.01)

(52) U.S. Cl.
CPC .......... *H04L 67/10* (2013.01); *H04L 65/1073* (2013.01)

(58) Field of Classification Search
CPC ........................... H04L 67/10; H04L 65/1073
See application file for complete search history.

(56) References Cited

U.S. PATENT DOCUMENTS 9,020,900 B2 * 4/2015 Vijayan Retnamma ..................... G06F 3/067
707/652
9,419,854 B1 * 8/2016 Wang .................. H04L 41/0654
(Continued)

FOREIGN PATENT DOCUMENTS

CN    102255794 A    11/2011
CN    103581250 A     2/2014
(Continued)

OTHER PUBLICATIONS

Chinese Patent Application No. 201811005570.4, First Office Action dated Oct. 21, 2020, 7 pages.
(Continued)

*Primary Examiner* — Blake J Rubin
(74) *Attorney, Agent, or Firm* — Lathrop GPM LLP

(57) ABSTRACT

Embodiments of the present disclosure provide a method, a device and a vehicle for message deduplication. The method includes: determining a node relationship with each publishing node by a subscribing node based on property information of the publishing node under the same topic as the subscribing node; determining a communication mode with each publishing node according to the node relationship; registering management modules corresponding to different communication modes according to the communication modes, so that after receiving a service message from the publishing node, a management module determines which subscribing nodes the service message is transmitted to based on a registration content and a unique identification of the publishing node carried in the service message. The service message may be transmitted to the corresponding subscribing node based on the registration content specifying the publishing node from which the service message is received under a certain communication mode.

12 Claims, 4 Drawing Sheets

(56) References Cited

U.S. PATENT DOCUMENTS

| | | | |
|---|---|---|---|
| 10,785,296 B1* | 9/2020 | Allison | H04L 67/12 |
| 2006/0149840 A1* | 7/2006 | Thompson | H04L 47/822 |
| | | | 709/224 |
| 2007/0291765 A1* | 12/2007 | Boley | H04L 47/2433 |
| | | | 370/395.21 |
| 2009/0254217 A1* | 10/2009 | Pack | G06N 3/008 |
| | | | 700/246 |
| 2014/0136414 A1* | 5/2014 | Abhyanker | G05D 1/024 |
| | | | 705/44 |
| 2015/0199458 A1* | 7/2015 | Bacon | G06F 30/20 |
| | | | 703/8 |
| 2015/0331422 A1* | 11/2015 | Hartung | H04L 12/40013 |
| | | | 701/23 |
| 2015/0339570 A1* | 11/2015 | Scheffler | G06N 3/04 |
| | | | 706/16 |
| 2016/0378614 A1* | 12/2016 | Thanasekaran | G06F 11/1464 |
| | | | 707/652 |
| 2017/0061290 A1* | 3/2017 | Harlow | G06N 5/022 |
| 2017/0075877 A1* | 3/2017 | Lepeltier | G06F 40/205 |
| 2017/0118599 A1* | 4/2017 | Cabral | H04W 4/40 |
| 2019/0044939 A1* | 2/2019 | Smith | H04L 9/0833 |
| 2019/0147736 A1* | 5/2019 | Camp | G08G 1/0133 |
| | | | 340/905 |
| 2019/0173951 A1* | 6/2019 | Sumcad | H04W 4/40 |
| 2019/0317802 A1* | 10/2019 | Bachmutsky | G06F 9/505 |
| 2019/0361697 A1* | 11/2019 | Hu | G06F 11/362 |
| 2020/0081754 A1* | 3/2020 | Booth | G06K 9/00711 |
| 2020/0213249 A1* | 7/2020 | Shen | H04L 49/9036 |
| 2021/0044555 A1* | 2/2021 | Orr | H04L 65/4015 |

FOREIGN PATENT DOCUMENTS

| | | |
|---|---|---|
| CN | 104754036 A | 7/2015 |
| CN | 104994166 A | 10/2015 |
| CN | 105978997 A | 9/2016 |
| CN | 106953901 A | 7/2017 |
| CN | 107733839 A | 2/2018 |
| WO | WO 2018000618 A1 | 1/2018 |

OTHER PUBLICATIONS

Chinese Patent Application No. 201811005570.4, English translation of First Office Action dated Oct. 21, 2020, 6 pages.

* cited by examiner

METHOD, DEVICE AND VEHICLE FOR MESSAGE DEDUPLICATION

CROSS-REFERENCE TO RELATED APPLICATIONS

This application is based upon and claims priority to Chinese Patent Application No. 201811005570.4, filed Aug. 30, 2018, the entire contents of which are incorporated herein by reference.

FIELD

Embodiments of the present disclosure relate to computer technology field, and more particularly, to a method, an apparatus, a device, a medium, and an unmanned vehicle for message deduplication.

BACKGROUND

At present, unmanned vehicles mostly adopt a topic-based publishing and a subscribing mode for communication. In order to improve the efficiency of data transmission, an adaptive communication mode is usually adopted. For example, for communication within the same process, pointers can be passed directly; for an inter-process communication within one host, a shared memory approach is available.

Different communication modes are isolated, which results in a situation where subscribers receive repeated messages from the same publisher, for example, the same subscriber will receive messages from the same publisher twice through in-process pointer mode and inter-process shared memory reading mode, resulting in repeated receipt of the same message and a waste of resources.

SUMMARY

In a first aspect, embodiments of the present disclosure provide a distributed system-based method for message deduplication, applied to subscribing nodes in a distributed system. The distributed system includes at least two subsystems, the at least two subsystems includes two scenarios of belonging to the same host and belonging to different hosts, each subsystem includes at least one node, the at least one node subscribes to or publishes a topic-based service message, the method includes:

determining a node relationship with each publishing node by a subscribing node based on property information of the publishing node under the same topic as the subscribing node, in which, the node relationship includes in-process, inter-process, or inter-host;

determining a communication mode with each publishing node according to the node relationship;

registering to management modules corresponding to different communication modes according to the communication modes, so that after receiving a service message from the publishing node, the management module determines which subscribing nodes the service message is transmitted to based on a registration content and a unique identification of the publishing node carried in the service message, in which the registration content is configured to specify the publishing node from which the service message is received under a certain communication mode.

In a second aspect, embodiments of the present disclosure provide a distributed system-based method for message deduplication applied to publishing nodes in a distributed system. The distributed system includes at least two subsystems, the at least two subsystems includes two scenarios of belonging to the same host and belonging to different hosts, each subsystem includes at least one node, the at least one node subscribes to or publishes a topic-based service message, the method includes:

determining a node relationship with each subscribing node by a publishing node based on property information of the subscribing node under the same topic as the publishing node, in which, the node relationship includes in-process, inter-process, or inter-host;

determining a communication mode with each subscribing node according to the node relationship;

transmitting the service message to management module corresponding to respective communication modes according to different communication modes, in which, the service message at least carries a unique identification of the publishing node, so that the management module determines which subscribing nodes the service message is transmitted to based on a preregistered content of each subscribing node and the unique identification of the publishing node, in which the registration content is configured for the subscribing node to specify the publishing node from which the service message is received under a certain communication mode.

In a third aspect, embodiments of the present disclosure provide a distributed system-based method for message deduplication, applied to management modules in a distributed system. The distributed system includes at least two subsystems, the at least two subsystems includes two scenarios of belonging to the same host and belonging to different hosts, each subsystem includes at least one node, the at least one node subscribes to or publishes a topic-based service message, the method includes:

receiving a service message from each publishing node, in which the service message at least carries a unique identification of the publishing node and a message topic;

determining a subscribing node set under the message topic according to the message topic;

determining which subscribing nodes in the subscribing node the service message is transmitted to according to a preregistered content of each subscribing node and the unique identification of the publishing node, in which the registration content is configured for the subscribing node to specify the publishing node from which the service message is received under a certain communication mode.

In a fourth aspect, embodiments of the present disclosure provide a distributed system-based apparatus for message deduplication, applied to subscribing nodes in a distributed system. The distributed system includes at least two subsystems, the at least two subsystems includes two scenarios of belonging to the same host and belonging to different hosts, each subsystem includes at least one node, the at least one node subscribes to or publishes a topic-based service message, the apparatus includes:

a node relationship determining module, configured to determine a node relationship with each publishing node based on property information of the publishing node under the same topic as the subscribing node, in which, the node relationship includes in-process, inter-process, or inter-host;

a communication mode determining module, configured to determine a communication mode with each publishing node according to the node relationship;

a management module registering module, configured to register to management modules corresponding to different communication modes according to the communication modes, so that after receiving a service message from the publishing node, the management module determines which subscribing nodes the service message is transmitted to based on a registration content and a unique identification of the publishing node carried in the service message, in which the registration content is configured to specify the publishing node from which the service message is received under a certain communication mode.

In a fifth aspect, embodiments of the present disclosure provide a distributed system-based apparatus for message deduplication, applied to publishing nodes in a distributed system. The distributed system includes at least two subsystems, the at least two subsystems include two scenarios of belonging to the same host and belonging to different hosts, each subsystem includes at least one node, the at least one node subscribes to or publishes a topic-based service message, the apparatus includes:

a node relationship determining module, configured to determine a node relationship with each subscribing node based on property information of the subscribing node under the same topic as the publishing node, in which, the node relationship includes in-process, inter-process, or inter-host;

a communication mode determining module, configured to determine a communication mode with each subscribing node according to the node relationship;

a service message transmitting module, configured to transmit the service message to management modules corresponding to respective communication modes according to different communication modes, in which the service message at least carries a unique identification of the publishing node, so that the management module determines which subscribing nodes the service message is transmitted to based on a preregistered content of each subscribing node and a unique identification of the publishing node, in which, the registration content is configured for the subscribing node to specify the publishing node from which the service message is received under a certain communication mode.

In a sixth aspect, embodiments of the present disclosure provide a distributed system-based apparatus for message deduplication, applied to management modules in a distributed system. The distributed system includes at least two subsystems, the at least two subsystems include two scenarios of belonging to the same host and belonging to different hosts, each subsystem includes at least one node, the at least one node subscribes to or publishes a topic-based service message, the apparatus includes:

a service message receiving module, configured to receive a service message from each publishing node, in which the service message at least carries a unique identification of the publishing node and a message topic;

a node set determining module, configured to determine a subscribing node set under the message topic according to the message topic;

a service message transmitting module, configured to determine which subscribing nodes in the subscribing node set the service message is transmitted to according to a preregistered content of each subscribing node and the unique identification of the publishing node, in which the registration content is configured for the subscribing node to specify the publishing node from which the service message is received under a certain communication mode.

In a seventh aspect, embodiments of the present disclosure provide an electronic device. The electronic device includes:

one or more processors; and a storage apparatus configured to store one or more programs.

When the one or more programs are executed by the one or more processors, the one or more processors are caused to implement the distributed system-based method for message deduplication applied to subscribing nodes in a distributed system according to any embodiment of the present disclosure.

In an eighth aspect, embodiments of the present disclosure provide an electronic device. The electronic device includes:

one or more processors; and a storage apparatus for storing one or more programs.

When the one or more programs are executed by the one or more processors, the one or more processors are caused to implement the distributed system-based method for message deduplication applied to publishing nodes in a distributed system according to any embodiment of the present disclosure.

In a ninth aspect, embodiments of the present disclosure provide an electronic device. The electronic device includes:

one or more processors; and a storage apparatus for storing one or more programs.

When the one or more programs are executed by the one or more processors, the one or more processors are caused to implement the distributed system-based method for message deduplication applied to management modules in a distributed system according to any embodiment of the present disclosure.

In a tenth aspect, embodiments of the present disclosure provide a storage medium including computer executable instructions. When executed by a computer processor, the computer executable instructions are configured to implement the distributed system-based method for message deduplication applied to subscribing nodes in a distributed system according to any embodiment of the present disclosure.

In an eleventh aspect, embodiments of the present disclosure provide a storage medium including computer executable instructions. When executed by a computer processor, the computer executable instructions are configured to implement the distributed system-based method for message deduplication applied to publishing nodes in a distributed system according to any embodiment of the present disclosure.

In a twelfth aspect, embodiments of the present disclosure provide a storage medium including computer executable instructions. When executed by a computer processor, the computer executable instructions are configured to implement the distributed system-based method for message deduplication applied to management modules in a distributed system according to any embodiment of the present disclosure.

In a thirteenth aspect, embodiments of the present disclosure provide a vehicle. The vehicle includes a vehicle body, and further includes an electronic device according to any one of embodiments of the present disclosure.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Embodiment 1

Figure 1:
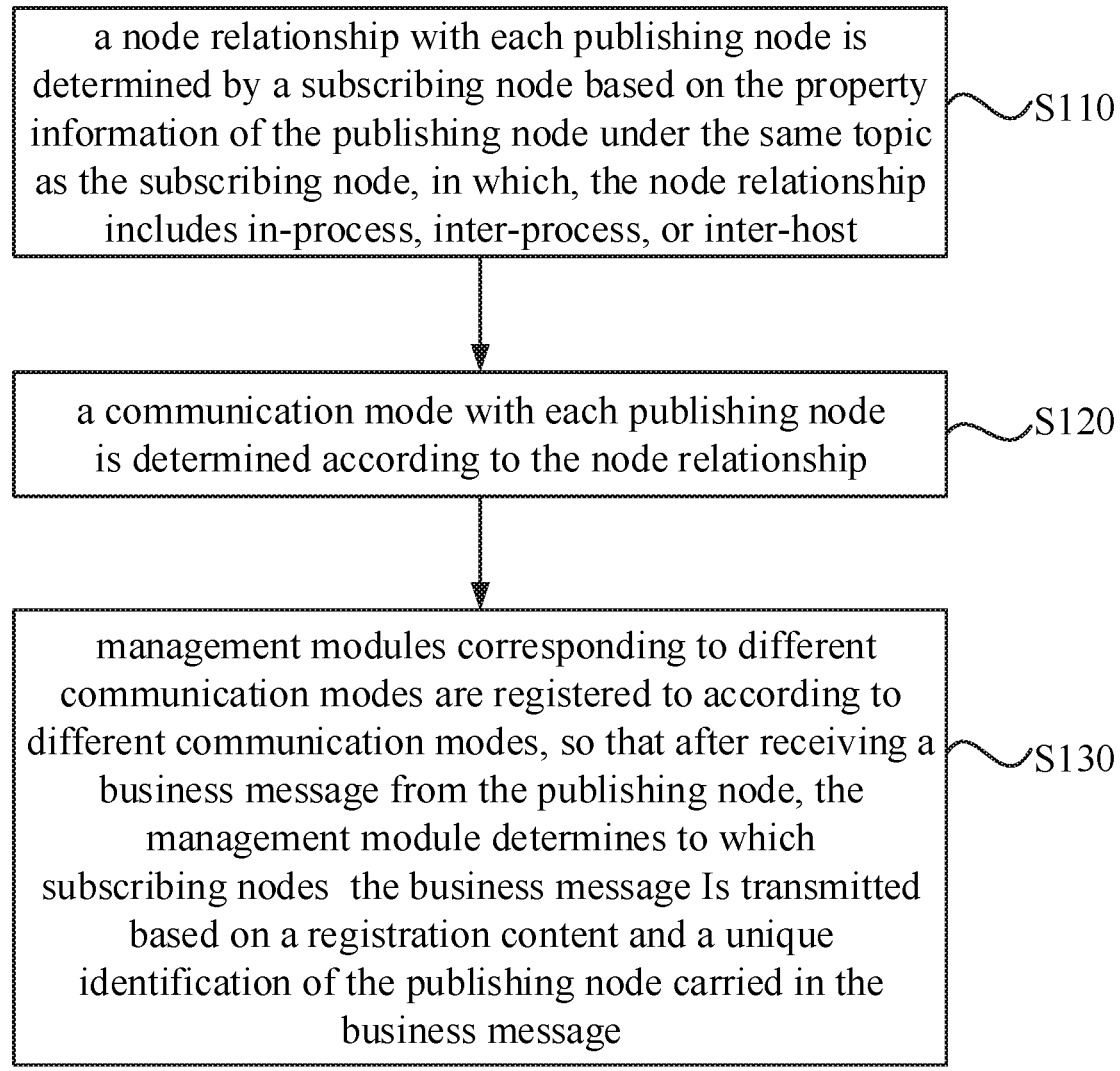
FIG. 1 is a flow chart of a distributed system-based method for message deduplication according to Embodiment 1 of the present disclosure.

FIG. 1 is a flow chart of a distributed system-based method for message deduplication according to Embodiment 1 of the present disclosure. This embodiment may be applied to avoid receiving duplicate messages in a distributed system. The method may be applied to subscribing nodes in the distributed system. The method may be implemented by a distributed system-based apparatus for message deduplication. The apparatus may be implemented by software and/or hardware. The apparatus may be configured on subscribing nodes in the distributed system, for example, nodes in an unmanned vehicle with a distributed system. As illustrated in FIG. 1, the method includes the following.

At block S110, a node relationship with each publishing node is determined by a subscribing node based on property information of the publishing node under the same topic as the subscribing node, in which, the node relationship includes in-process, inter-process, or inter-host.

The distributed system includes at least two subsystems, the at least two subsystems include two scenarios of belonging to the same host and belonging to different hosts, each subsystem includes at least one node, the at least one node subscribes to or publishes a topic-based service message. In the distributed system, at least one node subscribes to or publishes a service message of a certain topic, the node may receive service messages from other nodes based on that topic by subscribing to the topic. Accordingly, the role of the node may be a subscribing or a publishing node, the publishing node may be a producer of the message, and the subscribing node may be a consumer or a receiver of the message. A certain publishing node and its corresponding subscribing node may transmit and receive the service message based on a particular topic.

Specifically, a subscribing node may learn about the property information of a publishing node belonging to the same topic through topology discovery. For example, each of all nodes in the distributed system may transmit a topology message via a broadcast or multicast mode, in which the topology message may include attribute information such as a node role, a node name, a process name of a process to which the node belongs, a host name of a host to which the node belongs, and a topic of the service message.

In this way, the subscribing node may learn about the publication node under the same topic from the topology messages.

Optionally, the property information of the publishing node includes a node name, a subsystem to which the publishing node belongs, a process name of a process in which the publishing node is located, and/or a host name of a host to which the publishing node belongs. In addition, the attribution information of the publishing node further includes a topic of the service message. The node name may be a name identification of the node, such as a first node, a second node, or node a or node b, and the like; the node role may be an inflection of the specific function of the node in the distributed system, such as a publisher and/or subscriber of a message, or more specifically, a subscriber or a publisher for a topic. A Process is a running activity of a program in a computer about a data set. In the distributed system, each process may contain multiple nodes. The process name to which the node belongs may be the name of the process in which the node participates. The host name may be the identification of the host in the distributed system, such as a computing host or a control host and the like.

In an event that the subscribing node learns about the property information of the publishing node under the same topic, the subscribing node can then determine the node relationship between each publishing node and itself. Exemplarily, the relationship between the subscribing node and the publishing node can be determined through the process name to which the node belongs and the host name to which the node belongs, such as whether they belong to the same process and whether they belong to the same host. The node relationship includes in-process, inter-process, or inter-host. Exemplarily, if the nodes belong to the same host name and the same process name, the node relationship may be determined as in-process; if the nodes belong to the same host name but the different process names, the node relationship may be determined as inter-process; and if the nodes belong to the different host names, the node relationship may be determined as inter-host.

At block S120, a communication mode with each publishing node is determined according to the node relationship.

The communication mode may be the mode of information transmission between the subscribing node and the publishing node. Specifically, different node relationships may correspond to different communication modes. Exemplarily, if the node relationship is in-process, it may be determined that the communication mode is pointer passing; if the node relationship is inter-process, it may be determined that the communication mode is shared memory; if the node relationship is inter-host, it may be determined that the communication mode is a Socket communication mode.

At block S130, management modules corresponding to different communication modes are registered to according to the communication modes, so that after receiving a service message from the publishing node, the management module determines which subscribing nodes the service message is transmitted to based on a registration content and the unique identification of the publishing node carried in the service message.

The registration content is configured to specify the publishing node from which the service message is received under a certain communication mode. The unique identification of the publishing node carried in the service message may be used to distinguish the publishing node, in which the identification may be a unique character string or a field in other forms. Different communication modes may correspond to different management modules, and the subscribing node may register in the corresponding management modules for different communication modes between nodes. The management module corresponding to a certain communication mode may receive the service messages to be transferred in the certain communication mode from different publishing nodes, and then according to the unique identification of the publishing node in the service message, transmit the service message of the publishing node specified in the registration content to the corresponding subscribing node.

Exemplarily, if a publishing node a and a subscribing node b exist in a process A which shares a same host with a process B, and a publishing node c and a subscribing node d exist in the process B, the four nodes communicate based on a same topic. In the related art, the message m transmitted by the publishing node a will be transmitted out in two ways of in-process and inter-process. Since the subscribing node b knows that there is the publishing node a that is in the same process as it is and the publishing node c that is in a different process, both communication modes are initialized, which results in two copies of m received by the subscribing node b. Specifically, the publishing node a writes the message m transmitted to the subscribing node d into a shared memory, and after initializing the inter-process communication with the publishing node c of different processes, the subscribing node b will read the message m from the shared memory, which duplicates the message m that the subscribing node b receives directly through in-process communication from the publishing node a.

However, in embodiments of the present disclosure, by adding an additional field identifying the publishing node, the corresponding management module under a certain communication mode can identify the source of the message based on the identified field, and further transmit the message to the corresponding subscribing node according to the registered content. For example, for a message transmitted by the publishing node a, the subscribing node b can specify that only a message is received through in-process communication. This allows the subscribing node b to accept only the message transmitted by the publishing node a through the in-process communication, and no longer receive the same message through the shared memory mode.

In embodiments of the present disclosure, the subscribing nodes first register to the management modules, in which the registration content is configured to specify the publishing node from which the service message is received under a certain communication mode, and the subscribing node information in the registration content includes the identification of the publication node. That is, through the registration content, the subscribing node can specify the only one publishing node from which the message is received under a certain communication mode. In this way, the corresponding management module under a certain communication mode can identify the source of the message according to the identification of the publishing node, and the service message is then transmitted to the corresponding subscribing node as specified in advance, thereby preventing the subscribing node from receiving the same duplicate messages.

Embodiment 2

Figure 2:
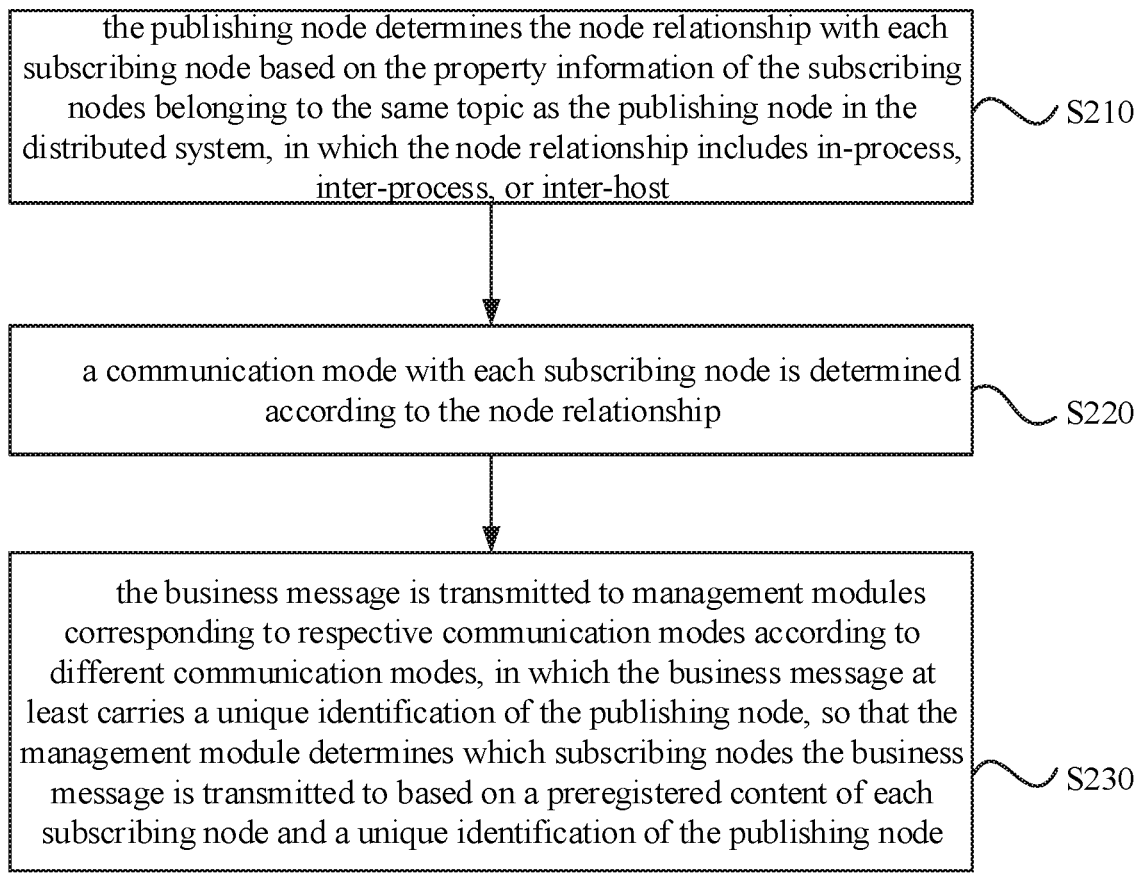
FIG. 2 is a flow chart of a distributed system-based method for message deduplication according to Embodiment 2 of the present disclosure.

FIG. 2 is a flow chart of a distributed system-based method for message deduplication according to Embodiment 2 of the present disclosure. This embodiment may be applied to avoid receiving duplicate messages in a distributed system. The method may be applied to publishing nodes in the distributed system and may be implemented by a distributed system-based apparatus for message deduplication. The apparatus may be implemented by software and/or hardware. The apparatus may be configured on publishing nodes in the distributed system, for example, nodes in an unmanned vehicle with a distributed system. As illustrated in FIG. 2, the method includes the following.

At block S210, the publishing node determines the node relationship with each subscribing node based on the information of the subscribing node belonging to the same topic as the publishing node in the distributed system, in which the node relationship includes in-process, inter-process, or inter-host.

The distributed system includes at least two subsystems, the at least two subsystems includes two scenarios of belonging to the same host and belonging to different hosts, each subsystem includes at least one node, and the at least one node subscribes to or publishes a topic-based service message.

At block S220, a communication mode with each subscribing node is determined according to the node relationship.

At block S230, the service message is transmitted to the management modules corresponding to respective communication modes according to different communication modes, in which the service message at least carries a unique identification of the publishing node, so that the management module determines which subscribing nodes the service message is transmitted to based on a preregistered content of each subscribing node and the unique identification of the publishing node.

The registration content is configured for the subscribing node to specify the publishing node from which the service message is received under a certain communication mode. According to different node relationships, there may be different communication modes. Correspondingly, the management modules corresponding to the communication modes may be set. For example, there may be an in-process communication management module, an inter-process communication management module, and an inter-host communication management module. After the publishing node determines the communication modes with respective nodes, the publishing node may transmit the service messages to be transmitted to the corresponding management modules based on different communication modes, so that the management module may determine to which subscribing nodes the corresponding service messages is transmitted based on the unique identification carried by the service message.

With respect to the explanation of relevant terms in block S210 and block S220 and the implementation of the steps, reference can be made to the explanation in Embodiment 1, which will not be elaborated here.

In the technical solution of this embodiment of the present disclosure, after determining the communication mode with the subscribing node, the publishing node transmits the service message to the management module corresponding to the communication mode. The service message published by the publishing node carries the unique identification of the publishing node, the management module transmits the service message to the corresponding subscribing node based on the identification of the publishing node identified and the content of a subscribing node that has been registered in the management module, thereby preventing the subscribing node from receiving duplicate messages. The registration content specifies receiving the message published by a certain publishing node through a certain communication mode.

Embodiment 3

Figure 3:
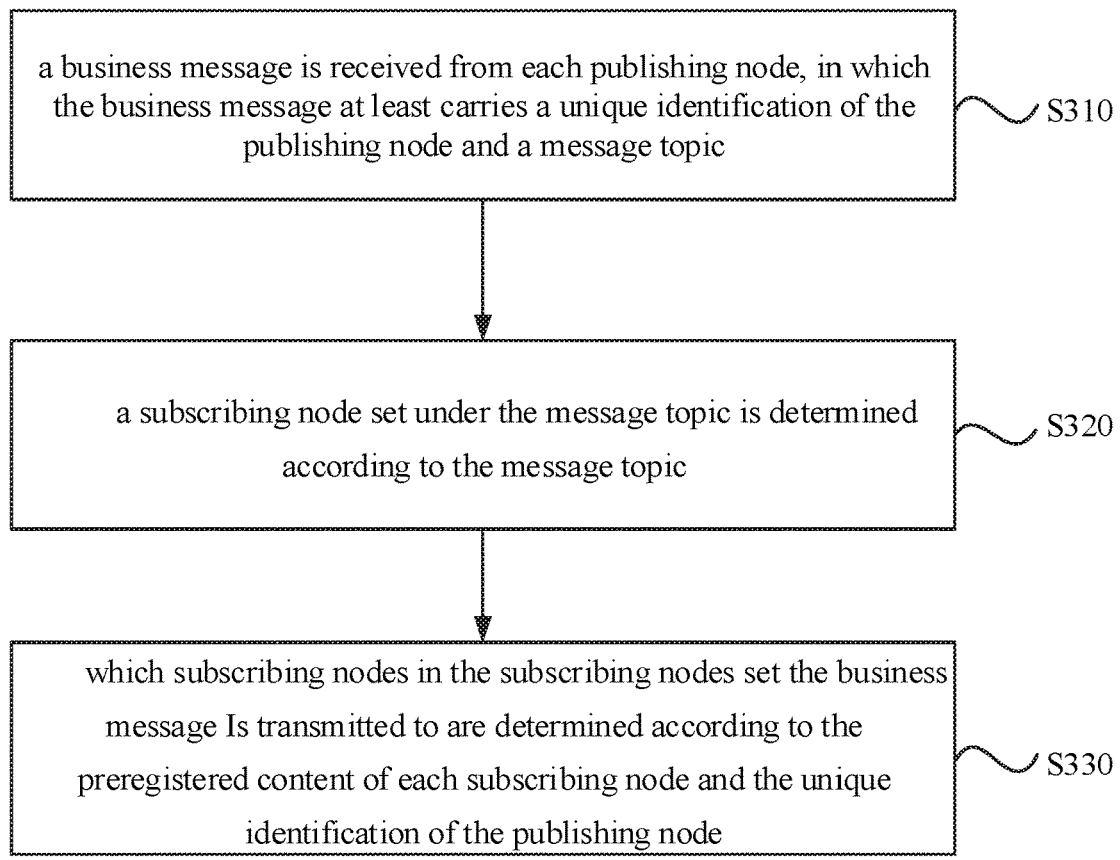
FIG. 3 is a flow chart of a distributed system-based method for message deduplication according to Embodiment 3 of the present disclosure.

FIG. 3 is a flow chart of a distributed system-based method for message deduplication according to Embodiment 3 of the present disclosure. This embodiment may be applied to avoid receiving duplicate messages in a distributed system. The method may be applied to management modules in the distributed system and may be implemented by a distributed system-based apparatus for message deduplication, and the apparatus may be implemented by software and/or hardware. The apparatus may be configured on management modules of the distributed system, for example, the management modules based on different communication modes in an unmanned vehicle with the distributed system. As illustrated in FIG. 3, the method includes the following.

At block 310, a service message is received from each publishing node, in which the service message at least carries a unique identification of the publishing node and a message topic.

The distributed system includes at least two subsystems, the at least two subsystems includes two scenarios of belonging to the same host and belonging to different hosts, each subsystem includes at least one node, and the at least one node subscribes to or publishes a topic-based service message.

The management module may be configured to manage the receiving and transmitting of service messages in various communication modes. In specific embodiments, the management module may include an in-process communication management module, an inter-process communication management module and an inter-host communication management module. The corresponding management module may receive a service message from each publishing node in the corresponding communication mode. Specifically, the publishing node will transmit the service message to the corresponding management module according to the node relationship with the subscribing node and the corresponding communication mode. The service message at least carries the unique identification of the publishing node and the message topic, in which the unique identification may be used to identify the publishing node transmitting the service message, and the message topic may be the topic of the service message, i.e., for which topic the service message is transmitted.

At block 320, a subscribing node set under the message topic is determined according to the message topic.

The management module may count in advance the role names of respective nodes, including whether is a subscriber or a publisher for a certain topic. As the service message carries message topic information, it is possible to determine all the subscribing nodes that have subscribed to the topic based on the message topic, which may form a subscribing node set.

At block 330, which subscribing nodes in the subscribing node set the service message is transmitted to are determined in the subscribing node set according to the preregistered content of each subscribing node and the unique identification of the publishing node.

The registration content is configured for the subscribing node to specify the publishing node from which the service message is received under a certain communication mode. Specifically, the management module may transmit the received service message to the corresponding subscribing nodes based on the preregistered content and the identification of the publishing node.

In the technical solution of this embodiment of the present disclosure, the publishing node transmits the service message to the management module corresponding to the communication mode, the management module transmits the service message to the corresponding subscribing node according to the identification of the publishing node identified and the content of the subscribing node that has been registered in the management module, thereby preventing the subscribing node from receiving duplicate messages. The registration content specifies receiving a message published by a publishing node through a communication mode, and the service message carries the unique identification of the publishing node and the message topic.

Embodiment

Figure 4:
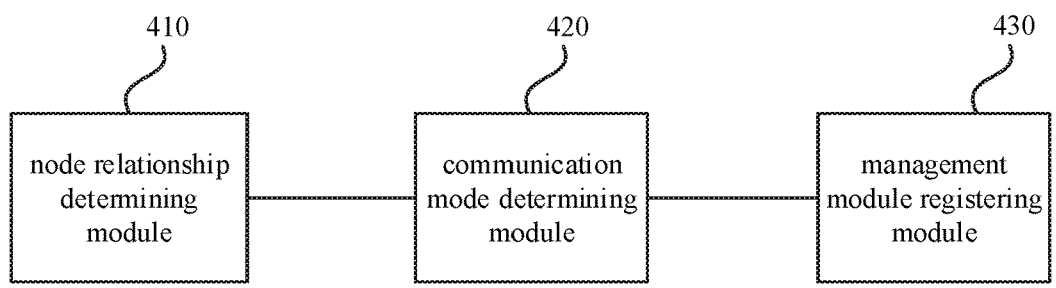
FIG. 4 is a schematic diagram of a distributed system-based apparatus for message deduplication according to Embodiment 4 of the present disclosure.

FIG. 4 is a schematic diagram of a distributed system-based apparatus for message deduplication according to Embodiment 4 of the present disclosure. This embodiment may be applied to avoid receiving duplicate messages in a distributed system. The distributed system includes at least two subsystems, the at least two subsystems includes two scenarios of belonging to the same host and belonging to different hosts, each subsystem includes at least one node, and the at least one node subscribes to or publishes a topic-based service message. The apparatus is configured on subscribing nodes in the distributed system, for example, nodes in an unmanned vehicle with a distributed system. As illustrated in FIG. 4, the apparatus includes a node relationship determining module 410, a communication mode determining mode 420 and a management module registering module 430.

The node relationship determining module 410 is configured to determine a node relationship with each publishing node based on property information of the publishing node under the same topic as the subscribing node, in which, the node relationship includes in-process, inter-process, or inter-host.

The communication mode determining module 420 is configured to determine a communication mode with each publishing node according to the node relationship.

The management module registering module 430 is configured to register to management modules corresponding to different communication modes according to the communication modes, so that after receiving a service message from the publishing node, the management module determines which subscribing nodes the service message is transmitted to based on a registration content and a unique identification of the publishing node carried in the service message, in which the registration content is configured to specify the publishing node from which the service message is received under a certain communication mode.

Optionally, the information of the publishing node includes a node name, a subsystem to which the publishing node belongs, a process name of a process in which the publishing node is located, and/or a host name of a host to which the publishing node belongs.

The distributed system-based apparatus for message deduplication provided by the embodiment of the present disclosure may implement the distributed system-based method for message deduplication that is applied to subscribing nodes in a distributed system provided by any one of embodiments of the present disclosure. The apparatus has the function modules and beneficial effects corresponding to implementing the method. For technical details not described in detail in this embodiment, reference may be made to the distributed system-based method for message deduplication that is applied to subscribing nodes in the distributed system provided by any one of embodiments of the present disclosure.

Embodiment 5

Figure 5:
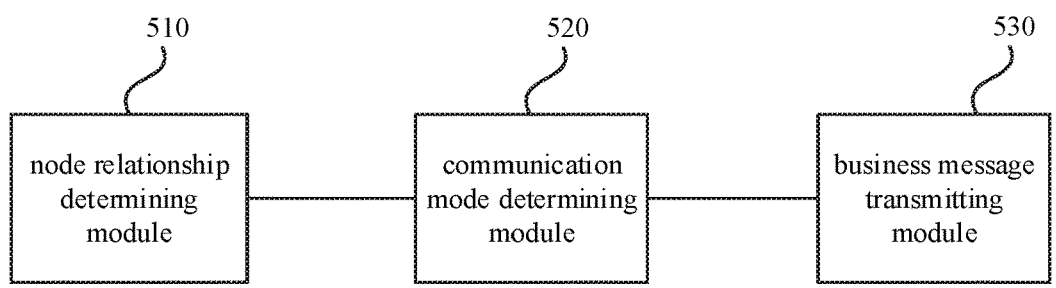
FIG. 5 is a schematic diagram of a distributed system-based apparatus for message deduplication according to Embodiment 5 of the present disclosure.

FIG. 5 is a schematic diagram of a distributed system-based apparatus for message deduplication according to Embodiment 5 of the present disclosure. The embodiment may be applied to avoid receiving duplicate messages in a distributed system. The distributed system includes at least two subsystems, the at least two subsystems includes two scenarios of belonging to the same host and belonging to different hosts, each subsystem includes at least one node, and the at least one node subscribes to or publishes a topic-based service message. The apparatus is configured on publishing nodes in the distributed system, for example, nodes in an unmanned vehicle with a distributed system. As illustrated in FIG. 5, the apparatus includes a node relationship determining module 510, a communication mode determining module 520, and a service message transmitting module 530.

The node relationship determining module 510 is configured to determine a node relationship with each subscribing node based on property information of the subscribing nodes under the same topic as the publishing node, in which, the node relationship includes in-process, inter-process, or inter-host.

The communication mode determining module 520 is configured to determine a communication mode with each subscribing node according to the node relationship.

The service message transmitting module 530 is configured to transmit the service message to management modules corresponding to respective communication modes according to different communication modes, in which the service message at least carries a unique identification of the publishing node, so that the management module determines to which subscribing nodes the service message is transmitted based on a preregistered content of each subscribing node and the unique identification of the publishing node, in which, the registration content is configured for the subscribing node to specify the publishing node from which the service message is received under a certain communication mode.

Optionally, the information of the publishing node includes a node name, a subsystem to which the publishing node belongs, a process name of a process in which the publishing node is located, and/or a host name of a host to which the publishing node belongs.

The distributed system-based apparatus for message deduplication provided by the embodiment of the present disclosure may implement the distributed system-based method for message deduplication that is applied to publishing nodes in a distributed system provided by any one of embodiments of the present disclosure. The apparatus has the function modules and beneficial effects corresponding to implementing the method. For technical details not described in detail in the embodiment, reference may be made to the distributed system-based method for message deduplication that is applied to publishing nodes in the distributed system provided by any one of embodiments of the present disclosure.

Embodiment 6

Figure 6:
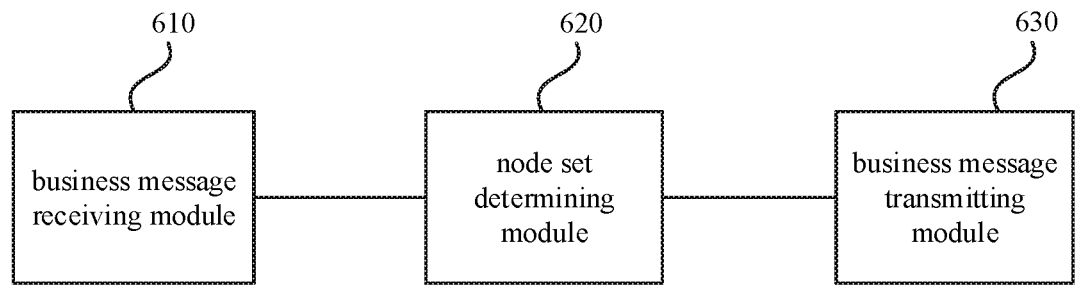
FIG. 6 is a schematic diagram of a distributed system-based apparatus for message deduplication according to Embodiment 6 of the present disclosure.

FIG. 6 is a schematic diagram of a distributed system-based apparatus for message deduplication according to Embodiment 6 of the present disclosure. This embodiment may be applied to avoid receiving duplicate messages in a distributed system. The distributed system includes at least two subsystems, the at least two subsystems includes two scenarios of belonging to the same host and different hosts, each subsystem includes at least one node, and the at least one node subscribes to or publishes a topic-based service message. The apparatus is configured on management modules in the distributed system, for example, management module based on different communication modes in an unmanned vehicle with a distributed system. As illustrated in FIG. 6, the apparatus includes a service message receiving module 610, a node set determining module 620 and a service message transmitting module 630.

The service message receiving module 610 is configured to receive a service message from each publishing node, in which the service message at least carries a unique identification of the publishing node and a message topic.

The node set determining module 620 is configured to determine a subscribing node set under the message topic according to the message topic.

The service message transmitting module 630 is configured to determine which subscribing nodes in the subscribing node set the service message is transmitted to according to the preregistered content of each subscribing node and the unique identification of the publishing node, in which the registration content is configured for the subscribing node to specify the publishing node from which the service message is received under a certain communication mode.

The distributed system-based apparatus for message deduplication provided by the embodiment of the present disclosure may implement the distributed system-based method for message deduplication that is applied to management modules in a distributed system provided by any one of embodiments of the present disclosure. The apparatus has the function modules and beneficial effects corresponding to implementing the method. For technical details not described in detail in the embodiment, reference may be made to the distributed system-based method for message deduplication that is applied to management modules in the distributed system provided by any one of embodiments of the present disclosure.

Embodiment 7

Figure 7:
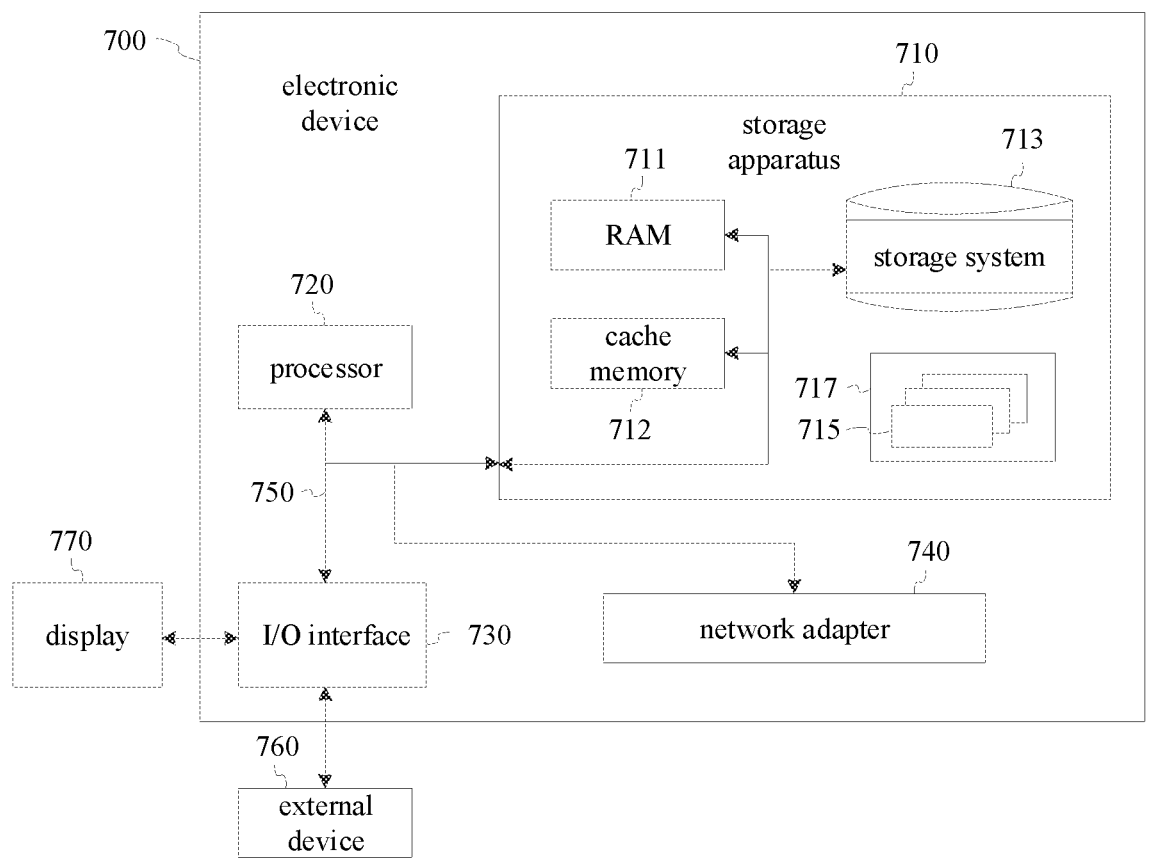
FIG. 7 is a schematic diagram of an electronic device according to Embodiment 7 of the present disclosure.

Referring to FIG. 7, the embodiment provides an electronic device 700, including: one or more processors 720; a storage apparatus 710 configured to store one or more programs. When executed by the one or more processors 720, the one or more programs enable the one or more processors 720 to implement the distributed system-based method for message deduplication applied to subscribing nodes in a distributed system according to any one of embodiments of the present disclosure. The method includes:

determining a node relationship with each publishing node based on property information of the publishing node under the same topic as the subscribing node, in which, the node relationship includes in-process, inter-process, or inter-host;

determining a communication mode with each publishing node according to the node relationship; and registering to management modules corresponding to different communication modes according to the communication modes, so that after receiving a service message from the publishing node, the management module determines which subscribing nodes the service message is transmitted to based on a registration content and a unique identification of the publishing node carried in the service message, in which the registration content is configured to specify the publishing node from which the service message is received under a certain communication mode.

Of course, those skilled in the art should understand that, the processor 720 may also implement the technical solution of the distributed system-based method for message deduplication provided by any one of embodiments of the present disclosure.

The electronic device 700 shown in FIG. 7 is only an example and should not impose any limitations on the function or scope of embodiments of the present disclosure.

As illustrated in FIG. 7, the electronic device 700 is represented as a general-purpose computing device. Components of the electronic device 700 may include but not be limited to: one or more processors 720, a storage apparatus 710, and a bus 750 connecting different system components (including the storage apparatus 710 and the processor 720).

The bus 750 represents one or more types of several bus architectures, including a memory bus or a memory controller, a peripheral bus, a graphics acceleration port, a processor or a local bus using any of several bus architectures. For example, these architectures include, but are not limited to, the industrial standard architecture (ISA) bus, the microchannel architecture (MAC) bus, the enhanced ISA bus, the video electronic standards association (VESA) local bus, and the peripheral component interconnection (PCI) bus.

The electronic device 700 typically includes a variety of computer system readable media. These media may be any available media that can be accessed by the electronic device 700, including volatile and non-volatile media, movable and immovable media.

The storage apparatus 710 may include computer system readable media in the form of volatile memory, such as a random access memory (RAM) 711 and/or a cache memory 712. The electronic device 700 may further include other removable/immovable, volatile/non-volatile computer system storage media. Just as an example, a storage system 713 may be used to read from and write into non-removable, non-volatile magnetic media (not shown in FIG. 7, commonly referred to as a "hard drive"). Although not shown in FIG. 7, a disk drive can be provided for reading from and writing into removable non-volatile disks (such as "floppy disks") and an optical disk drive can be provided for reading from and writing into removable, non-volatile optical disks (such as a CD-ROM, a DVD-ROM, or other optical media). In these cases, each driver may be connected to the bus 750 through one or more data media interfaces. The storage apparatus 710 may include at least one program product having a set of (for example, at least one) program modules configured to perform the functions of each embodiment of the present disclosure.

A program/utility 717 with a set of (at least one) program modules 715 may be stored in, for example, the storage apparatus 710. Such the program module 715 includes, but is not limited to, an operating system, one or more application programs, other program modules, and program data, and each or any combination of these examples may include an implementation of the network environment. The program module 715 generally performs functions and/or methods in any of embodiments described in the present disclosure.

The electronic device 700 may also communicate with one or more external devices 760 (such as keyboard, pointing device, display 770, etc.), and may also communicate with one or more devices that enable the user to interact with the electronic device 700, and/or communicate with any devices (such as a network card, a modem, etc.) that enables the electronic device 700 to communicate with one or more other computing devices. This kind of communication may be performed via an I/O interface 730. Also, the electronic device 700 may communicate with one or more networks (such as a local area networks (LAN), a wide area network (WAN), and/or a public network (such as the Internet)) through a network adapter 740. As illustrated in FIG. 7, the network adapter 740 communicates with other modules of the electronic device 700 via the bus 750. It should be understood that, although not shown in FIG. 7, other hardware and/or software modules, including but not limited to, a microcode, a device drive, a redundant processing unit, an external disk drive array, a RAID system, a tape drive, and a data backup and storage system, may be used in conjunction with the electronic device 700.

The processor 720 performs various functional applications and data processing by running programs stored in the storage apparatus 710, such as implementing the distributed system-based method for message deduplication provided by embodiments of the present disclosure.

Referring to FIG. 7, the specific hardware structure of the electronic device is illustrated, and for the specific structure functions and explanation, reference may be made to Embodiment 7 of the present disclosure, which will not be elaborated here.

Embodiments of the present disclosure further provide another electronic device, including: one or more processors; and a storage apparatus configured to store one or more programs. When executed by the one or more processors, the one or more programs enable the one or more processors to implement the distributed system-based method for message deduplication applied to publishing nodes in a distributed system according to embodiments of the present disclosure. The method includes:

determining a node relationship with each subscribing node by a publishing node based on the property information of the subscribing nodes under the same topic as the publishing node, in which, the node relationship includes in-process, inter-process, or inter-host;

determining a communication mode with each subscribing node according to the node relationship;

transmitting the service message to management modules corresponding to respective communication modes according to different communication modes, in which, the service message at least carries a unique identification of the publishing node, so that the management module determines which subscribing nodes the service message is transmitted to based on a preregistered content of each subscribing node and the unique identification of the publishing node, in which the registration content is configured for the subscribing node to specify the publishing node from which the service message is received under a certain communication mode.

Embodiments of the present disclosure further provide another electronic device, including: one or more processors; and a storage apparatus configured to store one or more programs. When executed by the one or more processors, the one or more programs enable the one or more processors to implement the distributed system-based method for message deduplication applied to management modules in a distributed system according to embodiments of the present disclosure. The method includes:

receiving a service message from each publishing node, in which the service message at least carries a unique identification of the publishing node and a message topic;

determining a subscribing node set under the message topic according to the message topic;

determining which subscribing nodes in the subscribing nodes set the service message is transmitted to according to a preregistered content of each subscribing node and the unique identification of the publishing node, in which the registration content is configured for the subscribing node to specify the publishing node from which the service message is received under a certain communication mode.

For the specific hardware structure of the electronic device, reference may be made to FIG. 7, and for the specific structure functions and explanation, reference may be made to relevant description in Embodiment 7 of the present disclosure, which will not be elaborated here.

Embodiment 8

The embodiment provides a storage medium including computer executable instructions. When executed by a computer processor, the computer executable instructions are configured to implement the distributed system-based method for message deduplication applied to subscribing nodes in a distributed system. The distributed system includes at least two subsystems, the at least two subsystems includes two scenarios of belonging to the same host and belonging to different hosts, each subsystem includes at least one node, and the at least one node subscribes to or publishes a topic-based service message. The method includes:

determining a node relationship with each publishing node by a subscribing node based on the property information of the publishing node under the same topic as the subscribing node, in which, the node relationship includes in-process, inter-process, or inter-host;

determining a communication mode with each publishing node according to the node relationship;

registering to management modules corresponding to different communication modes according to the communication modes, so that after receiving a service message from the publishing node, the management module determines which subscribing nodes the service message is transmitted to based on a registration content and a unique identification of the publishing node carried in the service message, in which the registration content is configured to specify the publishing node from which the service message is received under a certain communication mode.

Of course, in the storage medium including computer executable instructions provided by the embodiment of the present disclosure, the computer executable instructions are not limited to operate according to the method described above, but may also perform related operations of the distributed system-based method for message deduplication applied to subscribing nodes in a distributed system according to any of embodiments of the present disclosure.

The computer storage medium of the embodiment of the present disclosure may adopt any combination of one or more computer readable media. The computer readable media may be a computer readable signal media or a computer readable storage media. The computer readable storage media may be, but not limited to, for example, a system, an apparatus or a device of electricity, magnetism, light, electromagnetism, infrared, or semiconductors, or any combination thereof. More specific examples of the computer readable storage media (non-exhaustive list) include: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination of the above. In this document, the computer readable storage media may be any tangible media containing or storing a program that can be used by or in combination with an instruction execution system, apparatus or device.

The computer readable signal media may include a data signal transmitted in the baseband or as part of a carrier, which carries computer readable program codes. Such data signal may be transmitted in a variety of forms, including but not limited to an electromagnetic signal, an optical signal or any suitable combination thereof. The computer readable signal media may also be any computer readable medium other than the computer-readable storage medium. The computer readable medium may transmit, propagate or transfer a program for use by or in combination with an instruction execution system, apparatus or device.

The program codes contained in the computer readable medium may be transmitted via any appropriate medium, including, but not limited to a wireless, a wire, a cable, a RF, and the like, or any suitable combination thereof.

The computer program codes for performing the operation of the present disclosure may be written in one or more programming languages or a combination thereof. The programming languages include object-oriented programming languages such as Java, Smalltalk, and C++, as well as general procedural programming languages such as "C language" or similar programming languages. The program codes may be executed entirely on a user computer, partially on the user computer, as a separate software package, partially on the user computer, partially on a remote computer, or completely on the remote computer or server. In the case of a remote computer, the remote computer can be connected to the user computer via any kind of network—including a local area network (LAN) or a wide area network (WAN)—or can be connected to an external computer (for example, using an Internet service provider to connect via the Internet).

The embodiment of the present disclosure further provides another storage medium including computer executable instructions. When executed by a computer processor, the computer executable instructions are configured to implement the distributed system-based method for message deduplication applied to publishing nodes in a distributed system. The distributed system includes at least two subsystems, the at least two subsystems includes two scenarios of belonging to the same host and belonging to different hosts, each subsystem includes at least one node, and the at least one node subscribes to or publishes a topic-based service message. The method includes:

determining a node relationship with each subscribing node by a publishing node based on property information of the subscribing nodes under the same topic as the publishing node, in which, the node relationship includes in-process, inter-process, or inter-host;

determining a communication mode with each subscribing node according to the node relationship;

transmitting the service message to the management modules corresponding to respective communication modes according to different communication modes, in which, the service message at least carries a unique identification of the publishing node, so that the management module determines which subscribing nodes the service message is transmitted to based on a preregistered content of each subscribing node and the unique identification of the publishing node, in which the registration content is configured for the subscribing node to specify the publishing node from which the service message is received under a certain communication mode.

Of course, in the storage medium including computer executable instructions provided by the embodiment of the present disclosure, the computer executable instructions are not limited to operate according to the method described above, but may also perform related operations of the distributed system-based method for message deduplication applied to publishing nodes in the distributed system according to any of embodiments of the present disclosure.

The embodiment of the present disclosure further provides another storage medium including computer executable instructions. When executed by a computer processor, the computer executable instructions are configured to implement the distributed system-based method for message deduplication applied to management modules in a distributed system. The distributed system includes at least two subsystems, the at least two subsystems includes two scenarios of belonging to the same host and belonging to different hosts, each subsystem includes at least one node, and the at least one node subscribes to or publishes a topic-based service message. The method includes:

receiving a service message from each publishing node, in which the service message at least carries a unique identification of the publishing node and a message topic;

determining a subscribing node set under the message topic according to the message topic;

determining which subscribing nodes in the subscribing node set the service message is transmitted to according to a preregistered content of each subscribing node and the unique identification of the publishing node, in which the registration content is configured for the subscribing node to specify the publishing node from which the service message is received under a certain communication mode.

Of course, in the storage medium including computer executable instructions provided by the embodiment of the present disclosure, the computer executable instructions are not limited to operate according to the method described above, but may also perform related operations of the distributed system-based method for message deduplication applied to management modules in the distributed system according to any of embodiments of the present disclosure.

For the specific description of the storage medium, reference may be made to the relevant content in the embodiment, which will not be elaborated here.

Embodiment 9

Embodiment 9 of the present disclosure provides a vehicle. The vehicle includes a vehicle body, and further includes the electronic device according to any of embodiment of the present disclosure.

Specifically, the vehicle may be an unmanned vehicle, and the electronic device mounted on the unmanned vehicle may perform relevant operations of the distributed system-based method for message deduplication according to any of embodiments of the present disclosure.

It should be noted that, the above are only better embodiments of the present disclosure and the technical principles used therefore. Those skilled in the art will understand that the present disclosure is not limited to the particular embodiments described herein, and for those skilled in the art, various variations, readjustments and substitutions can be made to the present disclosure without departing from the scope of the present disclosure. Therefore, although the present disclosure is described in detail through the above embodiments, the present disclosure is not only limited to the above embodiments, but can also include more equivalent embodiments without deviating from the idea of the present disclosure, and the scope of the present disclosure is determined by the scope of the attached claims.

What is claimed is:

1. A method for message deduplication based on a distributed system, wherein the distributed system comprises at least two subsystems, the at least two subsystems comprise two scenarios of belonging to the same host and belonging to different hosts, each subsystem comprises at least one node, the at least one node subscribes to or publishes a topic-based service message, the method comprises:

determining a first node relationship with each publishing node by a subscribing node based on property information of the publishing node under the same topic as the subscribing node, wherein the first node relationship comprises in-process, inter-process, or inter-host;

determining a first communication mode with each publishing node by the subscribing node according to the first node relationship, wherein the first communication mode comprises a pointer passing communication mode, a shared memory communication mode, or a Socket communication mode, in which when the first node relationship comprises in-process, the first communication mode comprises the pointer passing communication mode; when the first node relationship comprises inter-process, the first communication mode comprises the shared memory communication mode; and when the first node relationship comprises inter-host, the first communication mode comprises the Socket communication node;

registering by the subscribing node to a management module corresponding to the first communication mode according to the first communication mode, in which there two or more first communication modes with each publishing node, the subscribing node registers a management module corresponding to one of the two or more first communication modes, so that after receiving a service message from each publishing node, the management module determines that the server message is transmitted to the subscribing node based on a registration content and an unique identification of each publishing node carried in the service message, wherein the registration content is configured to specify the publishing node from which the service message is received under a certain first communication mode; and receiving the server message that is sent from the publishing node to the management module, from the management module.

2. The method according to claim 1, wherein the property information of the publishing node comprises a node name, a subsystem to which the publishing node belongs, a process name of a process in which the publishing node is located, and/or a host name of a host to which the publishing node belongs.

3. The method according to claim 1, further comprising:

determining a second node relationship with each subscribing node by a publishing node based on property information of the subscribing nodes under the same topic as the publishing node, wherein the second node relationship comprises in-process, inter-process, or inter-host;

determining a second communication mode with each subscribing node by the publishing node according to the second node relationship;

transmitting by the publishing node the service message to management modules corresponding to respective second communication modes according to different second communication modes, wherein, the service message at least carries a unique identification of the publishing node, so that the management module determines which subscribing nodes the service message is transmitted to based on a preregistered content of each subscribing node and the unique identification of the publishing node, wherein the registration content is configured for the subscribing node to specify the publishing node from which the service message is received under a certain second communication mode.

4. The method according to claim 1, further comprising:

receiving by a management module in the distributed system, a service message from each publishing node, wherein the service message at least carries a unique identification of the publishing node and a message topic;

determining by the management module a subscribing node set under the message topic according to the message topic;

determining by the management module which subscribing nodes in the subscribing nodes set the service message is transmitted to according to preregistered content of each subscribing node and the unique identification of the publishing node, wherein the registration content is configured for the subscribing node to specify the publishing node from which the service message is received under a certain communication mode.

5. A distributed system, comprising:

at least two subsystems, the at least two subsystems comprising two scenarios of belonging to the same host and belonging to different hosts, each subsystem comprises at least one node, the at least one node subscribes to or publishes a topic-based service message, wherein the subscribing node is configured to implement:

determining a first node relationship with each publishing node based on property information of the publishing node under the same topic as the subscribing node, wherein the first node relationship comprises in-process, inter-process, or inter-host;

determining a first communication mode with each publishing node according to the first node relationship, wherein the first communication mode comprises a pointer passing communication mode, a shared memory communication mode, or a Socket communication mode, in which when the first node relationship comprises in-process, the first communication mode comprises the pointer passing communication mode; when the first node relationship comprises inter-process, the first communication mode comprises the shared memory communication mode; and when the first node relationship comprises inter-host, the first communication mode comprises the Socket communication node;

registering a management module corresponding to the first communication mode according to the first communication mode, in which there two or more first communication modes with each publishing node, the subscribing node registers a management module corresponding to one of the two or more first communication modes, so that after receiving a service message from each publishing node, the management module determines that the server message is transmitted to the subscribing node based on a registration content and an unique identification of each publishing node carried in the service message, wherein the registration content is configured to specify the publishing node from which the service message is received under a certain first communication mode; and receiving the server message that is sent from the publishing node to the management module, from the management module.

6. The system according to claim 5, wherein the property information of the publishing node comprises a node name, a subsystem to which the publishing node belongs, a process name of a process in which the publishing node is located, and/or a host name of a host to which the publishing node belongs.

7. The system according to claim 5, wherein the publishing node is configured to implement:

determining a second node relationship with each subscribing node based on property information of the subscribing nodes under the same topic as the publishing node, wherein the second node relationship comprises in-process, inter-process, or inter-host;

determining a second communication mode with each subscribing node according to the second node relationship;

transmitting the service message to management modules corresponding to respective second communication modes according to different second communication modes, wherein, the service message at least carries a unique identification of the publishing node, so that the management module determines which subscribing nodes the service message is transmitted to based on a preregistered content of each subscribing node and the unique identification of the publishing node, wherein the registration content is configured for the subscribing node to specify the publishing node from which the service message is received under a certain second communication mode.

8. The system according to claim 5, wherein a management module in the distributed system is configured to implement:

receiving a service message from each publishing node, wherein the service message at least carries a unique identification of the publishing node and a message topic;

determining a subscribing node set under the message topic according to the message topic;

determining which subscribing nodes in the subscribing nodes set the service message is transmitted to according to preregistered content of each subscribing node and the unique identification of the publishing node, wherein the registration content is configured for the subscribing node to specify the publishing node from which the service message is received under a certain communication mode.

9. A vehicle, comprising a vehicle body, and a distributed system, the distributed system comprising:

at least two subsystems, the at least two subsystems comprising two scenarios of belonging to the same host and belonging to different hosts, each subsystem comprises at least one node, the at least one node subscribes to or publishes a topic-based service message, wherein the subscribing node is configured to implement:

determining a first node relationship with each publishing node based on property information of the publishing node under the same topic as the subscribing node, wherein the first node relationship comprises in-process, inter-process, or inter-host;

determining a first communication mode with each publishing node according to the first node relationship, wherein the first communication mode comprises a pointer passing communication mode, a shared memory communication mode, or a Socket communication mode, in which when the first node relationship comprises in-process, the first communication mode comprises the pointer passing communication mode; when the first node relationship comprises inter-process, the first communication mode comprises the shared memory communication mode; and when the first node relationship comprises inter-host, the first communication mode comprises the Socket communication node;

registering a management module corresponding to the first communication mode according to the first communication mode, in which there two or more first communication modes with each publishing node, the subscribing node registers a management module corresponding to one of the two or more first communication modes, so that after receiving a service message from each publishing node, the management module determines that the server message is transmitted to the subscribing node based on a registration content and an unique identification of each publishing node carried in the service message, wherein the registration content is configured to specify the publishing node from which the service message is received under a certain first communication mode; and receiving the server message that is sent from the publishing node to the management module, from the management module.

10. The vehicle according to claim 9, wherein the property information of the publishing node comprises a node name, a subsystem to which the publishing node belongs, a process name of a process in which the publishing node is located, and/or a host name of a host to which the publishing node belongs.

11. The vehicle according to claim 9, wherein the publishing node is configured to implement:

determining a second node relationship with each subscribing node based on property information of the subscribing nodes under the same topic as the publishing node, wherein the second node relationship comprises in-process, inter-process, or inter-host;

determining a second communication mode with each subscribing node according to the second node relationship;

transmitting the service message to management modules corresponding to respective second communication modes according to different second communication modes, wherein, the service message at least carries a unique identification of the publishing node, so that the management module determines which subscribing nodes the service message is transmitted to based on a preregistered content of each subscribing node and the unique identification of the publishing node, wherein the registration content is configured for the subscribing node to specify the publishing node from which the service message is received under a certain second communication mode.

12. The vehicle according to claim 9, wherein a management module in the distributed system is configured to implement:

receiving a service message from each publishing node, wherein the service message at least carries a unique identification of the publishing node and a message topic;

determining a subscribing node set under the message topic according to the message topic;

determining which subscribing nodes in the subscribing nodes set the service message is transmitted to according to preregistered content of each subscribing node and the unique identification of the publishing node, wherein the registration content is configured for the subscribing node to specify the publishing node from which the service message is received under a certain communication mode.

* * * * *